US010049231B2

(12) United States Patent
Flach et al.

(10) Patent No.: US 10,049,231 B2
(45) Date of Patent: Aug. 14, 2018

(54) METHOD AND SYSTEM FOR OBFUSCATING THE PROPERTIES OF A WEB BROWSER

(71) Applicant: Praetorian Technologies, LLC, Baltimore, MD (US)

(72) Inventors: Ryan A Flach, Baltimore, MD (US); Chandler R Givens, Baltimore, MD (US)

(73) Assignee: TRACKOFF, INC., Baltimore, MD (US)

( * ) Notice: Subject to any disclaimer, the term of this patent is extended or adjusted under 35 U.S.C. 154(b) by 84 days.

(21) Appl. No.: 15/068,970

(22) Filed: Mar. 14, 2016

(65) Prior Publication Data
US 2016/0275311 A1  Sep. 22, 2016

Related U.S. Application Data

(60) Provisional application No. 62/134,219, filed on Mar. 17, 2015.

(51) Int. Cl.
*G06F 21/62* (2013.01)
*H04L 29/06* (2006.01)

(52) U.S. Cl.
CPC ...... *G06F 21/6263* (2013.01); *H04L 63/0421* (2013.01)

(58) Field of Classification Search
CPC .................. G06F 21/6263; H04L 63/0421
See application file for complete search history.

(56) References Cited

U.S. PATENT DOCUMENTS

| 6,760,912 | B1* | 7/2004 | Yarsa | G06F 9/44526 |
| | | | | 707/E17.119 |
| 9,787,637 | B2* | 10/2017 | Petry | H04L 63/0209 |
| 2011/0267202 | A1* | 11/2011 | Efthymiou | G01D 4/004 |
| | | | | 340/870.03 |
| 2012/0030576 | A1* | 2/2012 | Bell | G06F 21/6263 |
| | | | | 715/738 |
| 2014/0129670 | A1* | 5/2014 | Oliver | G06F 21/10 |
| | | | | 709/217 |
| 2014/0237589 | A1* | 8/2014 | Suggs | G06F 3/005 |
| | | | | 726/19 |

OTHER PUBLICATIONS

Nick Nikiforakis, Wouter Joosen, and Benjamin Livshits. 2015. PriVaricator: Deceiving Fingerprinters with Little White Lies. In Proceedings of the 24th International Conference on World Wide Web (WWW '15). International World Wide Web Conferences Steering Committee, Republic and Canton of Geneva, Switzerland, 820-830.*

(Continued)

*Primary Examiner* — Farid Homayounmehr
*Assistant Examiner* — Zhimei Zhu
(74) *Attorney, Agent, or Firm* — Miller Canfield Paddock and Stone; Mark L Maki

(57) ABSTRACT

A method for obfuscating the properties of a web browser includes identifying an active web browser and generating random assortments of properties compatible with the web browser. The generated random properties are then integrated with the true properties of the web browser to provide an obfuscated property set that, on request by a web server, may be communicated to the web server.

20 Claims, 6 Drawing Sheets

(56) References Cited

OTHER PUBLICATIONS

"Anonymous Browser Fingerprinting", Jul. 14, 2013, obtained online from <https://web.archive.org/web/20130716093023/http://valve.github.io/blog/2013/07/14/anonymous-browser-fingerprinting/>, retrieved on Jun. 19, 2018.*

Amin Faiz Khademi, "Browser Fingerprinting: Analysis, Detection, and Prevention at Runtime", a Master thesis, Oct. 2014.*

Gunes Acar, Marc Juarez, Nick Nikiforakis, Claudia Diaz, Seda Gürses, Frank Piessens, and Bart Preneel. 2013. FPDetective: dusting the web for fingerprinters. In Proceedings of the 2013 ACM SIGSAC conference on Computer & communications security (CCS '13). ACM, New York, NY, USA, 1129-1140.*

The International Search Report and Written Opinion of the International Searching Authority for PCT/US2016/022413, date completed Jun. 10, 2016, dated Jun. 20, 2016.

* cited by examiner

METHOD AND SYSTEM FOR OBFUSCATING THE PROPERTIES OF A WEB BROWSER

CROSS REFERENCE TO RELATED APPLICATIONS

This application asserts priority from provisional application 62/134,219, filed on Mar. 17, 2015, which is incorporated herein by reference.

BACKGROUND

The present invention relates generally to internet privacy, and in particular to prevention of identification and tracking of users via the collection of their web browsers' properties, thereby the mitigation of privacy threats.

In the current digital marketplace there exists a significant demand for detailed information regarding the online behavior of consumers. Insights provided by such data allow merchants to target individuals with highly user-specific advertisements, and enable analytics companies to predict users' consumption habits. While it is relatively trivial to collect data about the actions of a user on a single website, a challenge faced by analytics and advertising companies ("A&A companies") has been finding ways to obtain a comprehensive picture of a user's activities by tracking him or her across multiple websites. This is sometimes referred to as "cross domain tracking". To date, the primary solution has been through the use of cookie technology.

Cookies are data files placed on a user's computer by a web browser in accordance with instructions from a web server. Cross domain tracking historically involves website owners who partner with third-party A&A companies that use proprietary cookie technology to track the behavior of users across multiple websites. For example, a user may visit Website A, which utilizes the services of an analytics company. Code developed by the analytics company operating on Website A instructs the web browser to create a cookie on the user's computer that contains information uniquely identifying the user and the content that he or she viewed. Later, when the user visits Websites B and C—both of which utilize the same analytics company as Website A—the cookie is updated to reflect that the user viewed specific content on Websites A, B, and C. Thus, the analytics company has access to data showing the various websites and types of content preferred by the individual. For some users, a concerning manifestation of cross domain tracking occurs when a product he or she viewed on Website A appears, without solicitation, in an advertisement on Website C. Privacy conscious individuals often delete, or clear, their web browser cookies (manually or with the assistance of third party privacy software) to prevent this type of online tracking.

The deletion of cookies by privacy conscious users disrupts the data collection activities of A&A companies. To avoid such disruptions, A&A companies have begun shifting away from cookie technology and toward a new method of online tracking capable of uniquely identifying and tracking individuals by collecting properties about their web browsers. Research has shown that on average the properties associated with a web browser, once amalgamated, can uniquely identify a person with a statistically significant rate of accuracy. After an A&A company matches a specific individual with the properties of his or her web browser, e.g., by linking the user's web browser properties to login credentials (an e-mail address and password, for example), it is then possible to identify and track the user across domains with a high degree of precision. It is also exceedingly difficult for the user to prevent further tracking without switching to an entirely different web browser. Because this form of data collection cannot be prevented through the ex post deletion of files (as was the case with cookies), privacy conscious users require a technique that averts, in real-time, the appropriation of their web browser properties.

Accordingly, there is a need for technology that precludes or mitigates the ability of A&A companies—as well as other actors—to identify and track users based on the collection of the properties of their web browsers.

SUMMARY

In some aspects, an obfuscation method includes receiving information about and identifying the active web browser. The method also includes generating a random set of properties compatible with the identified active web browser by querying data located in a storage medium or in real-time using an algorithm. Subsequently the generated set of random properties may be integrated with the web browser's true properties, thus creating an obfuscated property set. On request by a web server, the obfuscated property set may be communicated to the web server.

In some aspects, an obfuscation system includes a computer program that is running on a computer system and that is configured to obfuscate the properties of a web browser. The computer program detects the active web browser and computes a random set of properties compatible with the running web browser by querying data located in a storage medium or in real-time using an algorithm. The computer program uses an obfuscation method to integrate the randomly generated set of properties with the web browser's true properties, thus creating an obfuscated property set. For example, in some embodiments, one of the computer program's obfuscation methods may cause the randomly generated properties to be substituted for certain of the web browser's true properties. On request by a web server, the computer program causes the web browser to communicate the obfuscated property set to the web server.

The notion of deterring privacy threats by obfuscating the properties of a device used to access the World Wide Web is not an intrinsically new idea. Significant efforts have been undertaken in the past to obfuscate the Internet Protocol (IP) address assigned to a user's computer while browsing the World Wide Web. Chief among them is the use of anonymous proxy servers, whereby traffic between the user's computer and the destination web server is transmitted through an intermediary proxy server, thus creating the appearance that the traffic originates from the IP address assigned to the proxy server, rather than the user's computer. Due to the structure of communications over the World Wide Web, however, A&A companies are still able to collect the properties of a user's web browser—even if he or she routes internet traffic through an anonymous web proxy. The obfuscation method and system disclosed herein is advantageous relative to some conventional obfuscation efforts since it prevents collection of the true properties of a user's web browser, and thus prevents identification and tracking of users.

BRIEF DESCRIPTION OF THE DRAWINGS

The present inventive subject matter may be understood further by reference to the following description and accompanying drawings, in which like reference numerals represent similar parts throughout the drawings and wherein.

DETAILED DESCRIPTION

In general, an obfuscation method and system provides privacy protection from certain forms of online tracking by altering in an automated fashion the properties of a user's web browser and transmitting the modified, or obfuscated, set of properties to third parties requesting the information. It is intended that the obfuscation method and/or system will frustrate the ability of the recipient of the obfuscated web browser properties from accurately identifying and tracking the online actions of an individual user.

Figure 1:
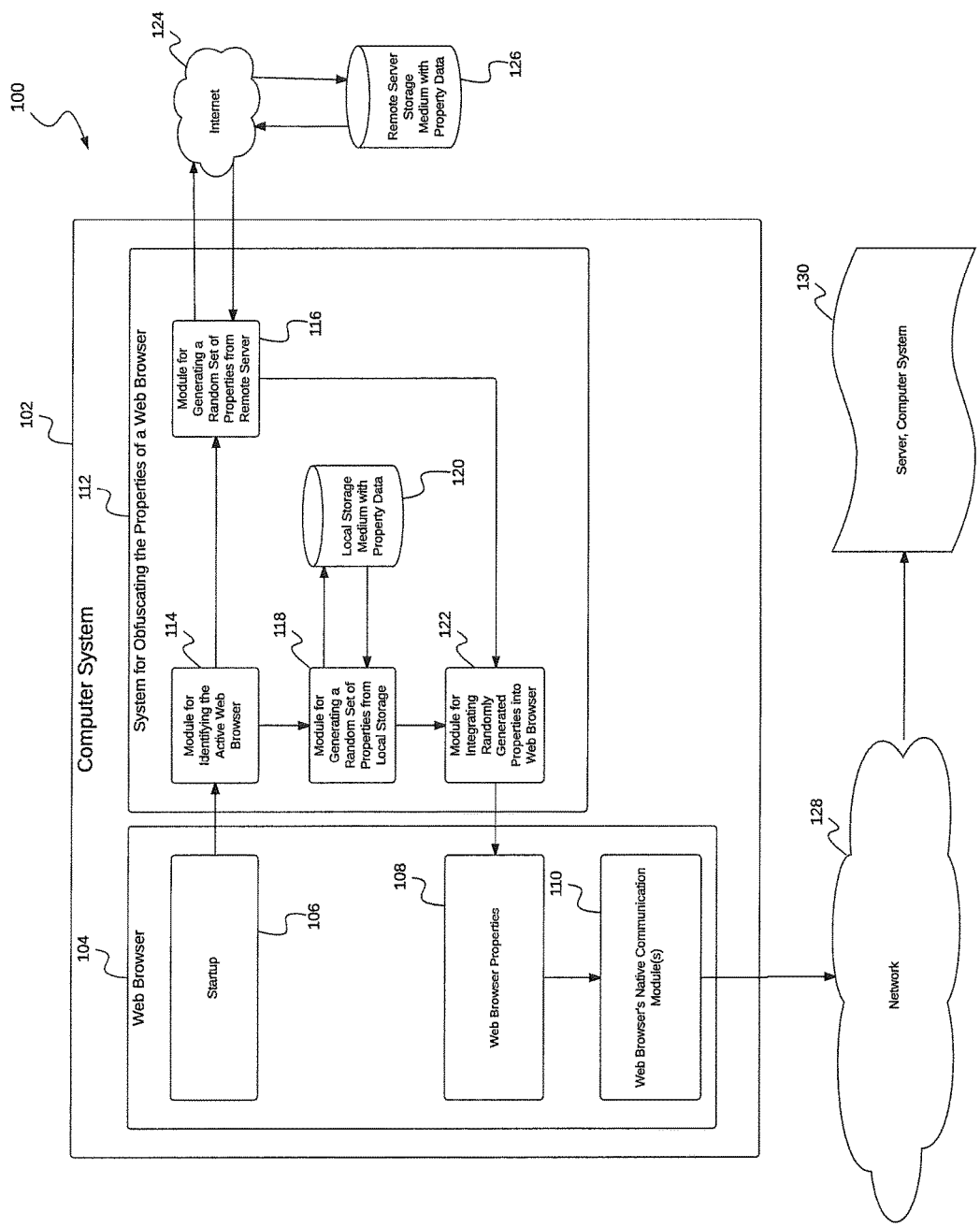
FIG. 1 is a schematic diagram of an obfuscating system for implementing a method of obfuscating the properties of a web browser.

Referring to FIG. 1, an obfuscation system 112 that is configured to obfuscate the properties of a user's web browser includes numerous modules implemented in a computer system 102, and is designed to provide specific functions to obfuscate a web browser's properties as described more fully herein. It is not necessary that all modules be present in a given embodiment, however for explanatory reasons it is helpful to understand how certain features may be combined to utilize the inventive subject matter. The example in FIG. 1 shows diagrammatically how the properties 108 of a web browser 104 may be obfuscated in accordance with one embodiment. As used herein, the term "web browser" refers to any software application that operates on any form of computing device, including but not limited to a mobile computing device such as a smartphone, or a tablet computer, and that is capable of accessing resources on a network. Examples of such a web browser 104 include, but are not limited to, commercially available software applications such as Microsoft Internet Explorer, Google Chrome, Mozilla Firefox, and the Opera Browser. In one embodiment, the computer system 102 may include one or more processors and computer readable storage on which a computer based operating system functions, wherein the computer system 102 may run any combination of computer programs thereon. The web browser 104 may be one such computer program.

The computer system 102 includes the web browser 104 and the obfuscation system 112, which in turn includes a module for identifying the active web browser 114, a module for generating a random set of properties from local storage 118, a module for generating a random set of properties from a remote server 116, and a module for integrating randomly generated properties into the web browser 122. Operation of each of the modules is described in more detail below. In addition, the computer system 102 includes a local storage medium 120 that includes property data used by the web browser. The computer system 102 is configured to communicate with the internet 124, which may include a remote server storage medium that includes property data. The computer system 102 may also communicate with a network 128 that in turn communicates with a remote server 130.

Figure 2:
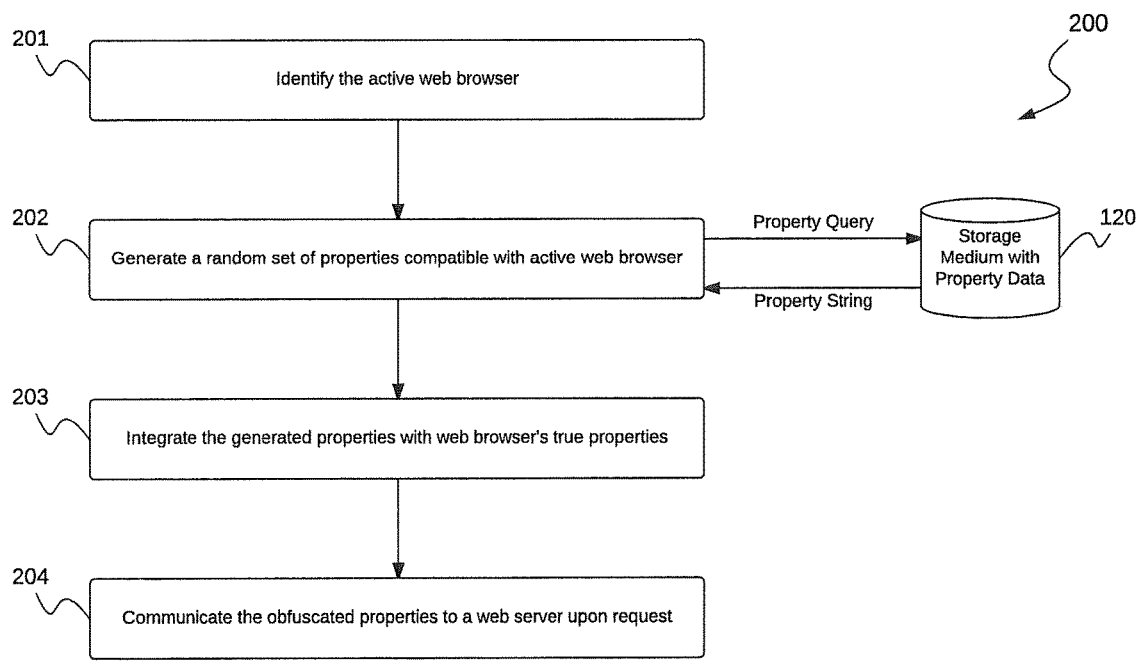
FIG. 2 is a flow chart illustrating the method of obfuscating the properties of a web browser.
Figure 3A:
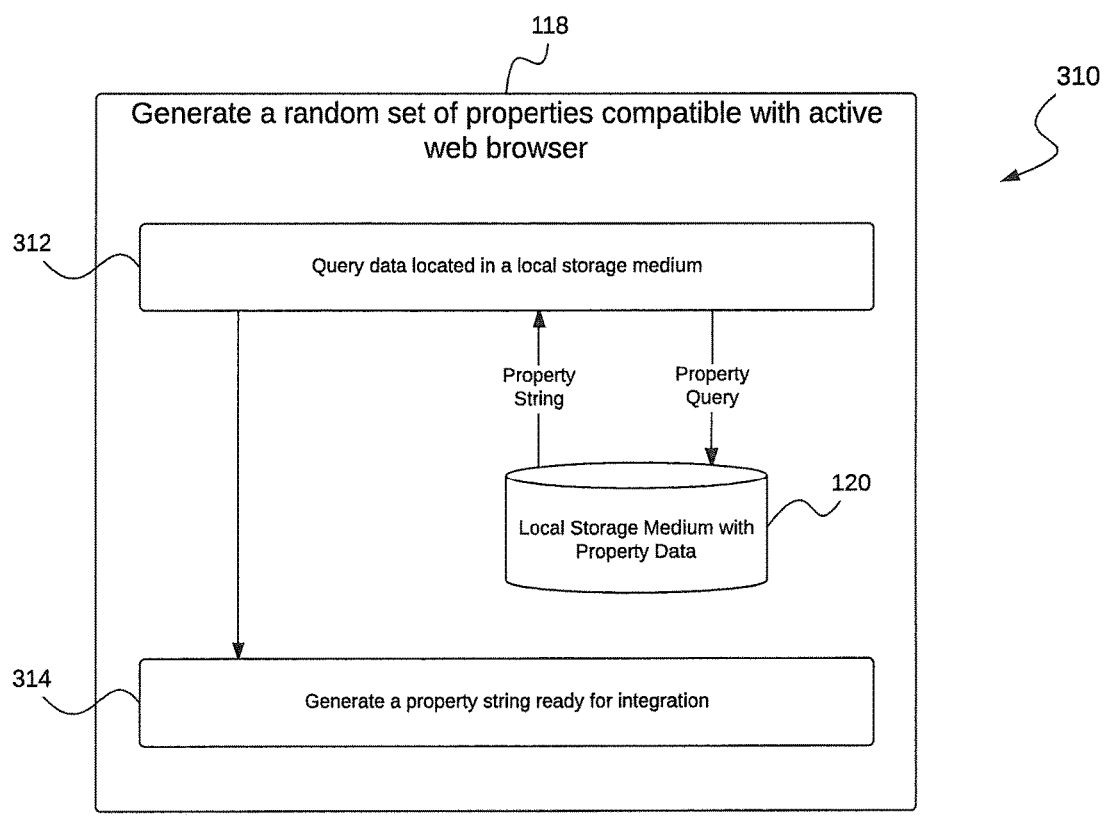
FIG. 3A illustrates a system module in which a random set of properties is created by querying a local storage medium.
Figure 3B:
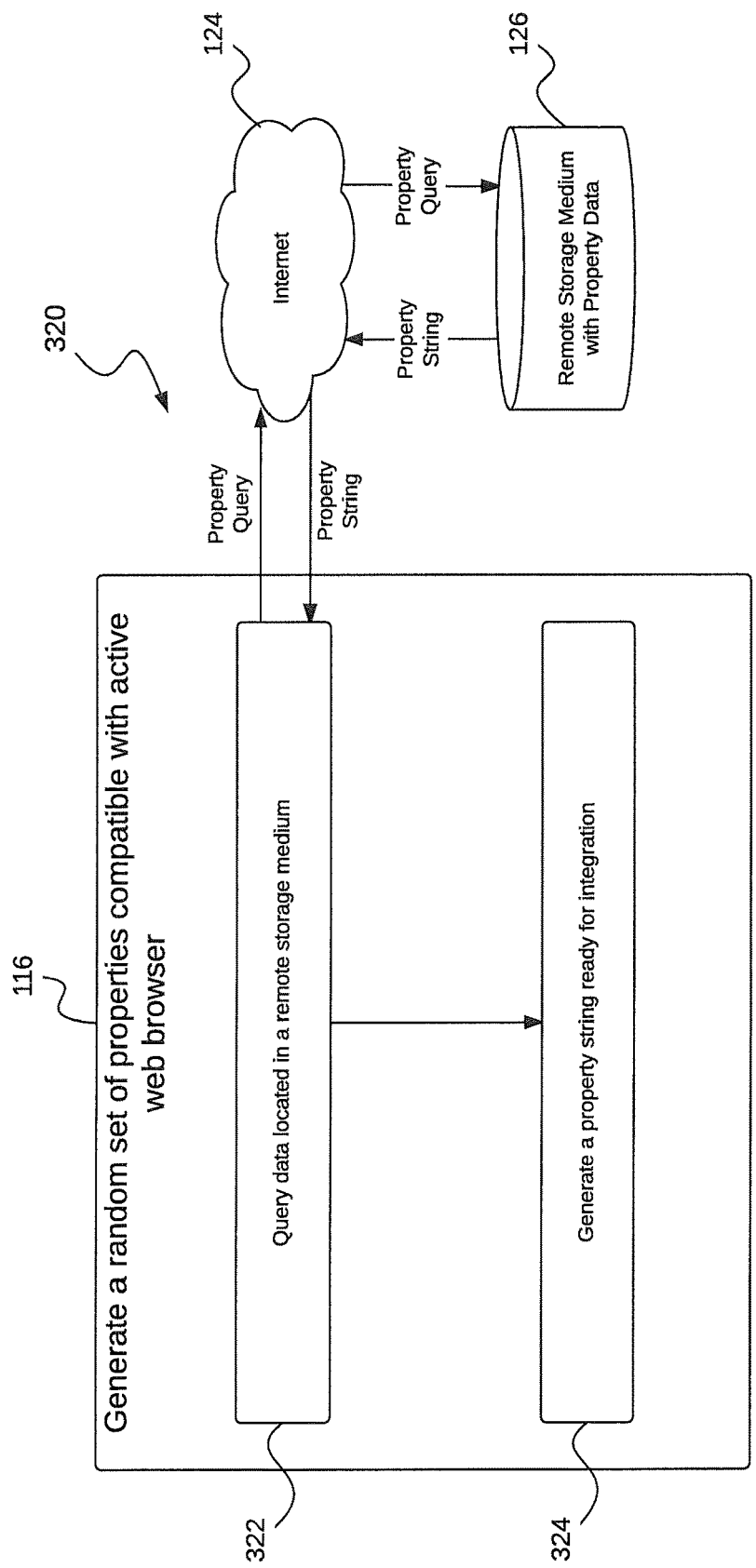
FIG. 3B illustrates a system module in which a random set of properties is created by querying a remote storage medium accessed via the internet.
Figure 4:
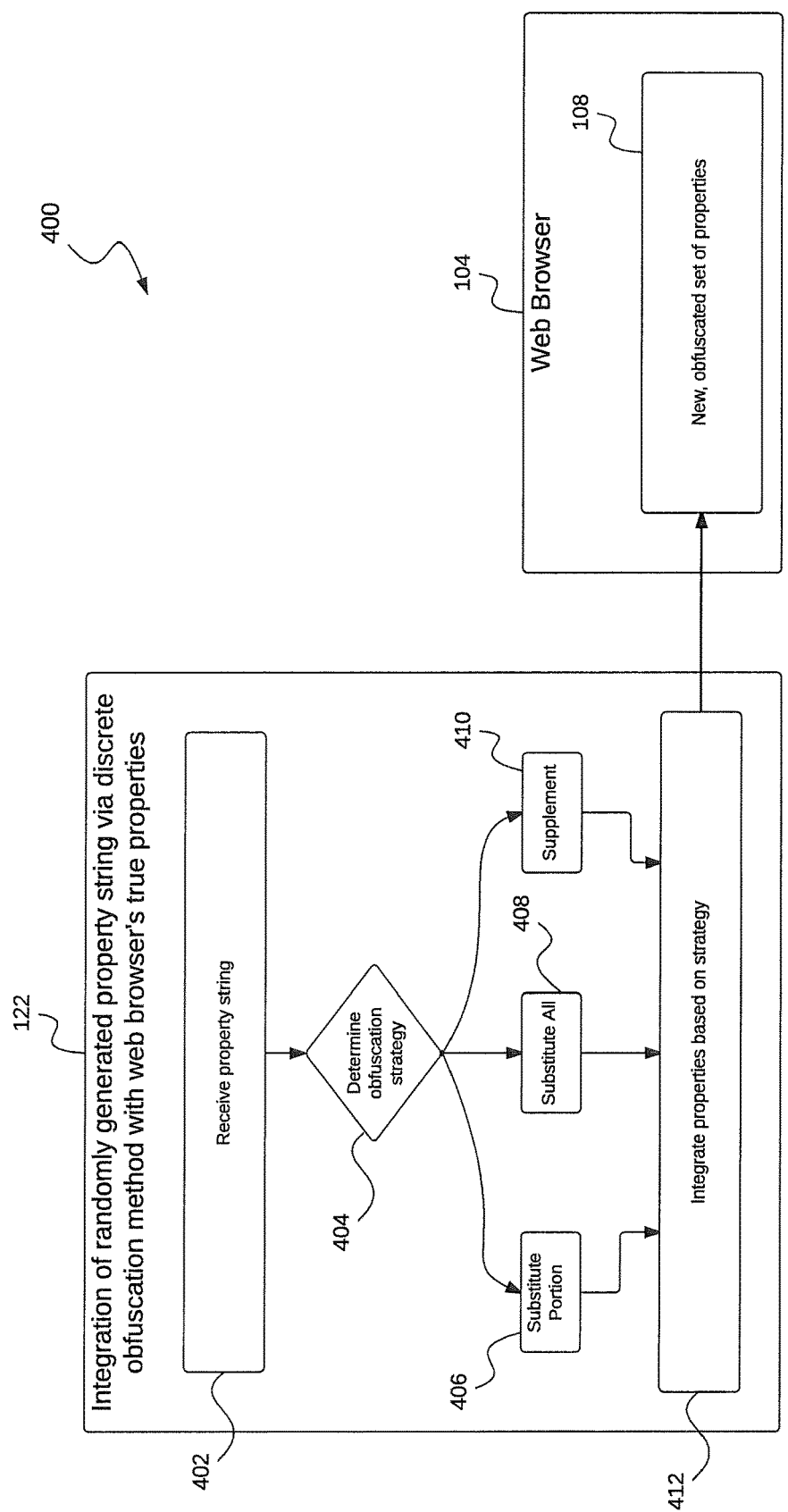
FIG. 4 illustrates a system module that is used to integrate randomly generated browser properties with a web browser's true properties.

Referring to FIGS. 2-4, the obfuscation method 200 is implemented by the various modules of the obfuscation system 112, which perform a series of steps to achieve obfuscation of a web browser's properties. The obfuscation method 200 includes the following method steps:

As an initial step (201), the active web browser 104 is identified. To this end, information sufficient to determine the active web browser 104 is collected. Such information may include, but is not limited to, identification of the type and version of the web browser 104.

In some embodiments, this initial step 201 may include using the module for identifying the active web browser 114 to request data from the operating system to identify currently running processes. For example, analyses may be performed to discern every computer application running on a computer system 102. A determination of the active web browser 104 may be based upon the inclusion of data in this list indicating that a web browser is active (for instance, the occurrence of a computer program named "iexplore.exe" may signify that the Microsoft Internet Explorer web browser is running).

In some embodiments, this step may be performed upon the triggering of a predefined event. For example, the method may include recursively listening for a predefined event to occur. An example of such a predefined event includes the instantiation of a web browser based on its first appearance amongst actively running computer programs. For example, these computer programs may be running on the computer system 102. Subsequently, an assessment of the web browser's type and version may be performed.

In step 2 (202), once the active web browser 104 is identified, a random set of properties compatible with the active web browser 104 is generated. The random set of properties compatible with the active web browser form an obfuscated property set.

In some embodiments, the step of generating a random set of properties compatible with the active web browser is achieved by using the module for generating a random set of properties from local storage 118 to query data located in a storage medium 120. For example, after identification of the type and version of the active web browser 104, it is possible to retrieve from a database a batch of properties predetermined to be compatible with the web browser and the system it runs on. The database may be stored locally on a computer system such as in the illustrated computer system 102, in independent data files, or hosted on a remote server 126 accessible via a network or the internet 124.

FIG. 3A illustrates operation of the module for generating a random set of properties from local storage 118, which creates a randomly generated set of properties compatible with the active web browser 104 by accessing data housed in a local storage medium 120. In particular, the module 118 queries data located in the local storage medium 120 (step 312). As a result of the query, a string or array (herein referred to collectively as "string") of properties is returned to the module 118. The module 118 uses the string of properties to generate one or more properties or strings ready for integration with the web browser's true properties (step 314). In some embodiments, the randomly generated properties may be retrieved at discrete points in time within a specified timeframe. For example, every 25 minutes a new batch of random properties may be retrieved from a database. In other embodiments, properties compatible with the web browser may be selected at random time intervals.

In some embodiments, instead of accessing local data, remote data is used to generate a random set of properties. FIG. 3B illustrates operation of the module for generating a random set of properties from a remote server 116, which creates a randomly generated set of properties compatible with the active web browser 104 by accessing data housed in a remote storage medium 126. In particular, the module 116 queries data located in the remote storage medium 126 via the internet 124 (step 322). As a result of the query, a string of properties is returned to the module 116. The module 116 uses the string of properties to generate one or more properties or strings ready for integration with the web browser's true properties (step 324). As before, the randomly generated properties may be retrieved at discrete points in time within a specified timeframe, or may alternatively be selected at random time intervals.

There are potentially dozens of properties currently used to track users, and it is likely that additional and/or different properties will be used in the future. A few examples of properties that may be captured include: the fonts supported by the web browser and the system it runs on, screen resolution, time zone, and the web browser's "user agent", where the term "user agent" refers to a string of data providing details on the hardware and software configuration of the computer system that the web browser runs on.

In some embodiments, the compatible properties are retrieved from a full or partial dataset of properties that are reliably known to work harmoniously with the type and version of the relevant web browser.

In other embodiments, a random set of properties compatible with the active web browser 104 is created. The creation of a random set of properties may be accomplished in various ways. In some embodiments, an algorithm may be designed to randomly select a number of properties within predefined parameters from a database. In another embodiment, an algorithm may be engineered to randomly generate a set of properties based on the format and structure of an individual property. For example, the algorithm may be engineered to retrieve from the database a random number (within a set range) of properties predetermined as compatible with the relevant web browser. In some embodiments, the algorithm may specify that properties should be selected at random time intervals from the database on a recurring basis.

In step 3 (203), once the random set of properties has been generated, and regardless of the specific mode used to obtain the random set of properties compatible with the active web browser, the random set of properties may be integrated with the web browser's true properties. This is achieved using the module for integrating randomly generated properties into the web browser 122. Referring now to FIG. 4, the module for integrating randomly generated properties into the web browser 122 receives the newly formed property string (step 402) and integrates it with the web browser's true properties according to an obfuscation strategy (step 404) that may take multiple forms. In one approach, integration 412 is achieved by substituting a portion of the web browser's true properties with a selected number of the generated properties (step 406), thus creating a new, obfuscated set of properties 108. In another approach, integration 412 is achieved by adding a selected number of generated properties to the web browser's true properties (step 410), thus forming a new, obfuscated set of properties 108. In yet another approach, integration 412 is achieved by substituting all of the web browser's true properties, on a one-for-one basis or otherwise, with generated properties (step 408), thus forming a new, obfuscated set of properties 108. Integration may also be conducted at predetermined time intervals, or at random time intervals within a set timeframe.

The randomness aspects (both timing and selection) of the approaches to the generation and integration of properties disclosed in steps 2 and 3 above aim to enhance the likelihood that A&A companies are unable, even for a short period, to create a reliable profile of a web browser's properties. A person skilled in the art will understand that additional variations of property generation and integration, as well as the timing of such actions, may be performed with the same result. Such variations fall within the scope of this inventive subject matter. Similar to aspects of the embodiments discussed above wherein the retrieval of properties from a local storage medium occurs at various time intervals, the integration of properties may be performed at predetermined time intervals in one embodiment. For example, a new batch of properties may be integrated with the web browser's true properties every 25 minutes. In another embodiment, integration may occur at random time intervals within a specified timeframe.

Referring again to FIGS. 1 and 2, the final step, step 4 (204) includes communicating the obfuscated property set to a web server upon request for a list of the web browser's properties. The obfuscated dataset of properties may be communicated, via the web browser's built-in communication module 110 or per another form of transmission over a network 128, to a web server 130 on request. Alternatively, the randomly generated properties compatible with the web browser 104 may be communicated independently on request from a web server 130, without first integrating them with the web browser's true properties.

In some embodiments, the randomly generated properties are communicated to a web server on request without first integrating them with the web browser's true properties. Put another way, the randomly generated properties may be communicated to the web server without first integrating the data with the web browser's true properties.

Figure 5:
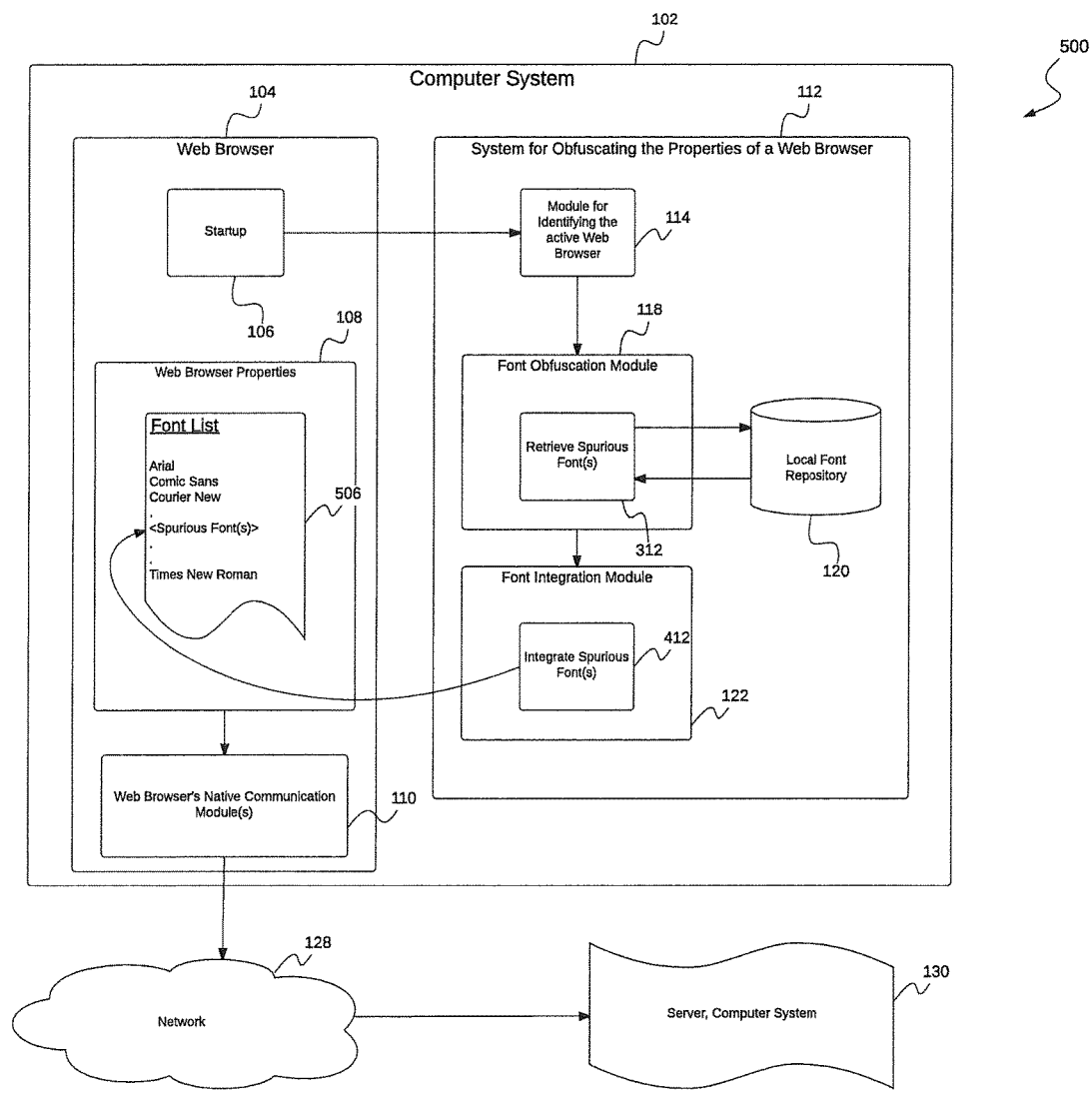
FIG. 5 illustrates an embodiment wherein a randomly generated set of fonts compatible with the active web browser are integrated with the web browser's true properties and communicated to a web server.

FIG. 5 is illustrates the method of obfuscation, as follows:

Upon identification of the active web browser 104 using the module for identifying the active web browser 114, the module for generating a random set of properties from local storage 118 is instructed to generate a random list of fonts compatible with the active web browser 104. The locally stored database 120 with a repository of properties compatible with the active web browser 104 is queried 312 by the generating module 118, a random assortment of spurious fonts is returned by the database 120, and a randomly generated font list is generated 314. The randomly generated font list is then integrated 412 with the web browser properties via the module for integrating randomly generate properties into the web browser 122. In this example, this is achieved by supplementing its true list of supported fonts 506 with the spurious fonts retrieved from the repository. On request by the web browser 104, the new, obfuscated set of fonts may then be transmitted, via the web browser's native communication module 110, to a web server 130.

It will be evident to one skilled in the relevant art that each block of the illustrations, and combinations of blocks in the illustrations described above, may be implemented by computer program instructions on a computer system. These computer program instructions may be provided to a processor on various sorts of computer systems including a machine intended solely to be used as a browsing device, processors on mobile computing devices such as smartphones and tablets, or other programmable data processing hardware to produce a machine, such that the instructions, which execute via the processor of the computer or other programmable data processing hardware, allow for the implementation of the functions described in the drawings.

The description above is provided to enable any person skilled in the art to make and use the obfuscation system and/or method and explains the best modes of doing so as now contemplated by the inventors. However, various modifications to the disclosed subject matter will be apparent to any person skilled in the art. Such modifications are intended to fall within the spirit and scope of the inventive subject matter.

What is claimed:

1. An obfuscation method, comprising:
   identifying an active web browser and a type of said active web browser which is one of different types of web browsers, said active web browser having web browser properties of different types associated therewith wherein said web browser properties are defined by true properties of said active web browser and a computing system on which said active web browser runs;
   identifying a property set of any of said different types of said web browser properties associated with said active web browser;
   establishing an obfuscation strategy based upon said type of said active web browser and characteristics of said property set;
   generating randomized properties compatible with said property set and said type of said active web browser;
   forming a new obfuscated property set using said randomized properties; and
   integrating said obfuscated property set into said active web browser to permit communication of said obfuscated property set instead of said property set of said true properties in response to a request for web browser properties received by a communication module wherein the randomized properties of said obfuscated property set are integrated with the active web browser's true properties at random time intervals.

2. The method of claim 1, wherein the active web browser is identified upon launch of the active web browser.

3. The method of claim 1, wherein the active web browser is identified based upon predefined criteria associated with the active web browser.

4. The method of claim 1, wherein the randomized properties compatible with the active web browser are generated by querying data located in a local storage medium.

5. The method of claim 1, wherein the randomized properties compatible with the active web browser are generated by querying data located on a remote server.

6. The method of claim 1, wherein the randomized properties are integrated with said web browser properties by supplementing the active web browser's true properties.

7. The method of claim 1, wherein the randomized properties are integrated with said web browser properties by replacing all of the active web browser's true properties.

8. The method of claim 1, wherein the randomized properties are integrated with said web browser properties by substitution of only a portion of the active web browser's true properties.

9. The method of claim 1, wherein the web browser is a software application that operates on a computing device, including but not limited to a mobile computing device including a smartphone, or a tablet computer, that is capable of accessing resources on a network.

10. The method of claim 1, wherein said generating step is performed periodically and said obfuscated property set is integrated into said active web browser after each generating step independent of receipt of any said request for web browser properties by said communication module.

11. A system including a processor and a non-transitory computer-readable medium comprising one or more instructions that when executed by said processor, cause the processor to perform an obfuscation method comprising the method steps of:
   identifying an active web browser and a type of said active web browser which is one of different types of web browsers, said active web browser having web browser properties of different types associated therewith wherein said web browser properties are defined by true properties of said active web browser and a computing system on which said active web browser runs;
   identifying a property set of any of said different types of said web browser properties associated with said active web browser;
   establishing an obfuscation strategy based upon said type of said active web browser and characteristics of said property set;
   generating randomized properties compatible with said property set and said type of said active web browser;
   forming a new obfuscated property set using said randomized properties; and
   integrating said obfuscated property set into said active web browser to permit communication of said obfuscated property set instead of said property set of said true properties in response to a request for web browser properties received by a communication module wherein the instructions, when executed by the processor, cause the randomized properties of said obfuscated property set to be integrated with the active web browser's true properties at random time intervals.

12. The system of claim 11, wherein the instructions, when executed by the processor, identify the active web browser when it is launched.

13. The system of claim 11, wherein the instructions, when executed by the processor, identify the active web browser based upon predefined criteria.

14. The system of claim 11, wherein the instructions, when executed by the processor, compute the randomized properties compatible with the active web browser by querying data located in a local storage medium.

15. The system of claim 11, wherein the instructions, when executed by the processor, compute the randomized properties compatible with the active web browser by querying data located on a remote server.

16. The system of claim 11, wherein the instructions, when executed by the processor, cause the randomized properties to be integrated by supplementing the active web browser's true properties.

17. The system of claim 11, wherein the instructions, when executed by the processor, cause the randomized properties to be integrated by replacing all of the active web browser's true properties.

18. The system of claim 11, wherein the instructions, when executed by the processor, cause the randomized properties to be integrated by substitution of only a portion of the active web browser's true properties.

19. The system of claim 11, wherein the web browser is a software application that operates on a computing device, including but not limited to a mobile computing device including a smartphone, or a tablet computer, that is capable of accessing resources on a network.

20. The system of claim 11, wherein said generating step is performed periodically and said obfuscated property set is integrated into said active web browser after each generating step independent of receipt of any said request for web browser properties by said communication module.

* * * * *